July 26, 1932.          R. R. COLLINS          1,868,886
METHOD AND APPARATUS FOR PROMOTING CONTACT
Filed Oct. 11, 1928
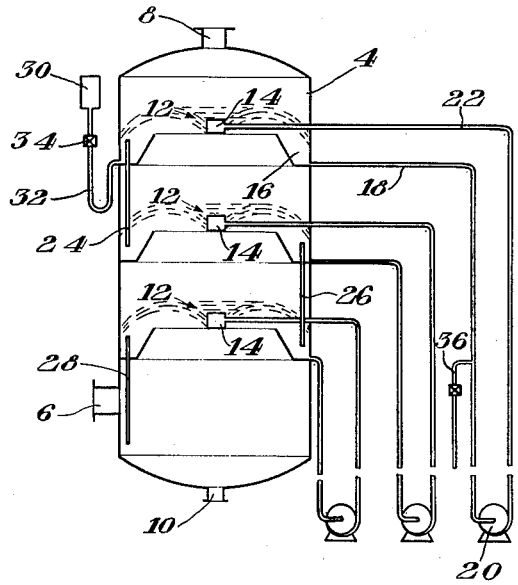
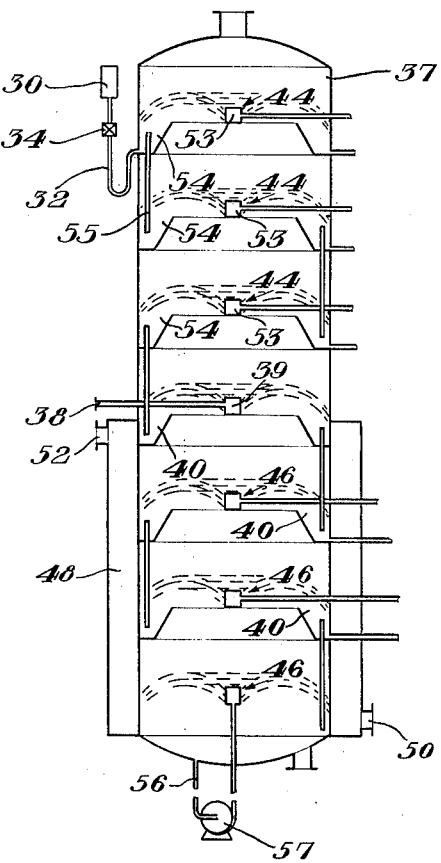
Witness
George O. Rigby.
Inventor
Raymond R. Collins
by his attorneys
Van Everen Fish
Hildreth Heary Patented July 26, 1932

1,868,886

UNITED STATES PATENT OFFICE

RAYMOND R. COLLINS, OF NEWTON, MASSACHUSETTS, ASSIGNOR TO THE LUMMUS COMPANY, A CORPORATION OF DELAWARE

METHOD AND APPARATUS FOR PROMOTING CONTACT

Application filed October 11, 1928. Serial No. 311,804.

The present invention relates to methods and apparatus for promoting intimate contact between a liquid and a vapor or gas.

One object of the present invention is to provide a method and apparatus by which an intimate contact of a large volume of vapor or gas with a liquid may be effected.

A further object of the present invention is to devise a method and apparatus for rectification of oils whereby vaporized constituents of the oil contact with a reflux liquid, and according to which an intimate contact between particles of the liquid and vapor is assured, notwithstanding the large volume of the vapor which is necessary to be handled, particularly when the operations are carried out under vacuum.

With these objects in view, one feature of the present invention consists in a tower having provision for passing gases or vapors therethrough, together with means for distributing sprays or curtains of the liquid in finely divided form transversely across the vapor stream. The vapors are thereby caused to pass through successive zones of liquid spray in sufficient quantity to assure substantial contact of all vapor particles with the particles of liquid. The spraying means are preferably located in the center of the tower to spread the liquid spray over the entire cross-section, and the liquid is collected in troughs which are arranged near the wall of the tower in such positions as not to impede the passage of vapors through the tower.

Another feature of the invention comprises means arranged externally of the tower for circulating the spray liquid from the collecting troughs back to the spraying means, whereby the liquid is repeatedly employed for contact with the vapors. The provision of external pumping means is not only advantageous because of the absence of obstructions within the tower, but is highly desirable from the standpoint of eliminating moving parts within the tower, which are always attended with difficulty, especially if a high vacuum is maintained in the interior of the tower.

Although the invention is useful for promoting contact between any liquid and any gas, it is especially valuable in connection with the rectification of heavy oils. Such oils are preferably distilled under an extremely high vacuum, and the vapors are caused to contact with a reflux liquid. The vacuum must be sufficiently high to insure distillation at a temperature low enough to prevent decomposition, and the high vacua usually required result in such an augmentation of the volume of vapor as to preclude the desired intimacy of a contact under ordinary methods. It will be realized that the use of boiling cap towers or other well-known efficient contact apparatus is not feasible, due to the fact that the high degree of vacuum required cannot be maintained in all parts of the tower because of the back pressure introduced by the liquid seals on the boiling cap decks. Further, it is apparent that towers of the baffle type in which the vapors pass through an extended path are ineffective in fractionation under high vacuum because of the impossibility of effecting intimate contact between the relatively large volume of the vapors and the relatively small volume of the reflux liquid flowing downward over the baffles.

According to the present invention, all particles of the vaporized oil, no matter how large the volume may be, are assured of intimate contact with the reflux liquid, the volume of which may be relatively small. The sprays or curtains in the several zones through which the vapors pass form, in effect, blankets of liquid covering the entire area of passage of the vapors. The fineness of division of the liquid assures a large aggregate surface area for contact with the vapors. The invention therefore comprehends a method of fractionating oils which consists in passing vapors under a high vacuum through successive zones of sprays of reflux liquid, whereby there is effected an intimacy of contact between the liquid and the vapor not heretofore obtained in high vacuum distillation processes. Furthermore, the method permits the utilization of a large percentage of the cross-sectional area of the tower for the passage of the vapor.

A further feature of the invention, as it relates to rectification of oils, consists in spraying reflux liquids in different zones in the tower, admitting oil in vapor or liquid form at the bottom or an intermediate point in the tower, collecting the liquids separately in the different zones, and permitting the liquids to overflow during the process into successive zones below. If admitted in liquid form, the oil is largely converted into vapor immediately upon entrance into the evacuated tower. The atomized liquids in the several zones are caused to give up their lighter constituents to the vapor, and to take up the heavier constituents from the vapor. This substitution between vapor and liquid results in a progressive increase in higher boiling constituents of the liquids in the various zones from top to bottom of the tower, and a progressive decrease in the quantity of higher boiling constituents in the vapor stream as it moves through the tower from inlet to outlet. A clear line of separation between the constitution of the distillate and that of the residue is thereby maintained.

Other features of the invention consist in certain novel features of construction and modes of operation hereinafter described and particularly defined in the claims.

In the accompanying drawing, Fig. 1 is a sectional elevation of the preferred form of apparatus for promoting contact between a liquid and a gas; and Fig. 2 is a sectional elevation of a form of the apparatus particularly adapted for fractional distillation of oils under vacuum.

As herein illustrated and described, the invention is embodied in a method and apparatus for effecting fractional distillation of oils under vacuum, although it will be understood that the apparatus may be employed for the purpose of effecting the fractional distillation of any volatile liquid mixture or for effecting intimate contact between a liquid and a gas or vapor for any purpose such as washing, scrubbing, etc.

Referring to Fig. 1, the tower 4 has a vapor inlet 6, a vapor outlet 8, and an outlet 10 for removal of liquid fractions. The vapor entering the inlet 6 passes upwardly to the outlet 8, the tower being maintained under a considerable vacuum when the apparatus is employed for the distillation of heavy oils. The vacuum ordinarily employed is as complete as practicable and must at least be sufficiently high to permit distillation at temperatures which will insure against cracking or decomposition of the oil. The vapor passes upwardly through a number of zones, indicated in Fig. 1 as three zones 12 in which a completely atomized spray of reflux liquid serves to fill the entire cross-sectional area of the tower. For the purpose of forming the sprays, a number of nozzles 14 are provided, one for each zone, the liquid being sprayed through the nozzles and across the tower to be collected in annular collecting troughs 16 which are supported by the inner walls of the tower. A circulating system for pumping the collected liquid back into the nozzle is provided for each zone. For the uppermost zone, the liquid is conducted from the trough 16 through a pipe 18 through a pump 20 from which it is forced through a pipe 22 into the nozzle 14. A similar pump and piping system is provided for each of the other two zones, all of the pumps, however, being maintained separate from each other.

A feature of importance when distillation is conducted under vacuum consists in placing all of the pumps 20 at a considerable distance below the bottom of the tower 4. This distance should be of the order of magnitude of the length of the column of liquid which would be supported by atmospheric pressure. It will be seen that if the pumps were placed at about the same level as the tower, they would be required to be protected against the inrush of atmospheric air because of the high vacuum maintained in the tower. By placing them at a level below the tower which approximates the barometric height of the column of oil, the pumps may be operated without special precautions.

An overflow pipe 24 extends upwardly into the uppermost chamber 16 and serves to permit an overflow of liquid into the next collection trough below. A similar overflow pipe 26 permits overflow from the second trough into the third, and a pipe 28 permits overflow from the bottom trough into the bottom of the tower.

Reflux liquid is admitted into the top collecting trough from a supply 30 to a pipe 32, the amount of reflux being controlled by a valve 34.

The actual construction of the various parts of the tower may be of any usual or preferred form. The nozzles in particular are ordinary atomizing spray nozzles each of which preferably delivers one or more blankets of spray from the center of the tower towards the collecting trough on the side. Preferably the blankets of spray delivered by the nozzles will be given a direction such that the liquid spray will tend to impart a turbulent flow to the vapor favorable to thorough mixing of the contacted vapor. It will be seen that inasmuch as the pump connections are all external to the tower, there is no interior mechanism which would materially obstruct the flow of vapors and, what is more important, there is no necessity for introducing mechanically moving parts which might require elaborate provisions against inflow of atmospheric air.

For the operation of the apparatus for distillation of oil, the oil vapors from a suitable still are admitted through the inlet 6. It will be assumed that the apparatus is to be used for recovering heavy cylinder oil from a mixture thereof with wax distillate. The cylinder oil will ultimately be collected in the bottom of the tower from which it may be readily removed, and the wax distillate vapors will pass out through the outlet 8 where they may be condensed and a portion of the condensate returned as reflux to the top of the tower. The oil mixture which it is desired to fractionate may be heated in a suitable vessel under vacuum to as high a temperature as desirable without cracking or decomposition and it is for the purpose of permitting distillation under a relatively low temperature that a high vacuum is maintained within the tower. Reflux liquid is admitted to the upper collecting trough from the supply 30, the amount of liquid being controlled by the valve 34. The pumps continuously recirculate the liquids in the several zones to form blankets of spray across the passage of the vapors. The speed of circulation will preferably be kept as high as possible in order to promote intimate contact of particles of the spray with the vapors, and this rate of circulation is entirely independent of the rate of admission of the reflux liquid. As the vapor passes upwardly through the tower, a substitution takes place between the vapors and the liquid spray, the vapors giving up the high boiling constituents to the liquids and the liquids giving up the low boiling constituents to the vapors. Considering the uppermost zone 12, it will be seen that the volume of liquid entering the collecting trough will be augmented as the process continues, both by reason of the admission of fresh reflux liquid through the pipe 32, and also because of the introduction of high boiling fractions from the vapor. When the trough becomes filled to the top of the overflow pipe, some of the liquid flows down into the next trough below. Overflow also takes place from the second trough to the third and so on, the final overflow from the bottom trough running into the bottom of the tower. The constitution of the liquid products in the several zones undergoes a progressive increase in the proportion of higher boiling components from the top of the tower to the bottom, while the vapor undergoes a progressive decrease in the proportion of higher boiling components from the inlet to the outlet. The method therefore works on the counter current principle, the vapors rich in higher boiling components contacting with the higher boiling liquid at the bottom and the lighter vapors from which some of the heavier constituents have been removed contacting with the lighter liquids in the upper zones.

The constitution of the ultimate product in any case will depend largely upon the quantity and constitution of the reflux liquid admitted from the supply 30. In general, the reflux liquid will have approximately the same constitution as the condensed distillate passing out of the outlet 8, although if it is desired at any time to increase the quantity of light constituents in the distillate, a correspondingly lighter reflux liquid may be employed. Inasmuch as the quantity of high boiling constituents in the liquids increases in the various zones from top to bottom of the tower, it will be seen that quantities of the different liquids may be removed from the different collecting troughs. Thus some liquid may be removed from each of the troughs 16 as well as from the bottom of the tower, in which case, four liquids having four different constitutions may be obtained. A pipe 36 with a valve is shown in Fig. 1 for the purpose of removing an intermediate product from the pipe 18.

The operation of the apparatus offers no difficulties to those familiar with the use of vacuum distilling apparatus. The method and apparatus of the present invention, however, afford a highly successful means of effectively fractionating oil mixtures. The desired ultimate product may be removed from the bottom of the tower, intermediate products may be taken from the collecting troughs, and the distillate leaving the outlet 8 may be condensed and further processed in any desired manner.

Although the invention as described above includes three zones of atomized spray, it will be understood that the number of zones may be greater or less as may be required. In general, the effectiveness of the fractionating process will be somewhat increased by increasing the number of zones through which the vapors are required to pass.

A modified form of the apparatus especially useful for oil distillation is shown in Fig. 2, in which the tower 37 has a fluid inlet 38 intermediate to its ends. Through this inlet enters the oil or other liquid to be distilled. The liquid in the pipe 38 will be heated, prior to its admission into the tower, to as high a temperature as possible without decomposition, and will be under some pressure because of the resistance of the pipe. The pipe 38 connects with a spray nozzle 39 similar to the nozzles 14 previously described. As soon as the heated liquid is discharged into the tower, which is maintained under a high vacuum, a part of its sensible heat is converted into latent heat, thereby changing a considerable portion of the liquid into vapor. Unvaporized particles of the liquid are thrown into an annular collecting trough 40. The oil to be distilled may, however, be admitted in its vapor form, through a vapor inlet similar to the inlet 6 of Fig. 1, but located at an intermediate point in the tower.

Spraying zones are provided both above and below the inlet, three zones 44 being arranged above and three zones 46 below the inlet. The bottom part of the tower below the inlet 38 is heated by a jacket 48 through which flue gases may be caused to pass from an inlet 50 to an outlet 52. Because of the intimate contact of the sprayed liquid with the heated shell of the tower and the contact of the liquid in the troughs and the bottom chamber with the heated shell, this provides an effective method of imparting heat to the liquid below the feed inlet. Any suitable heating means may be substituted for the jacket 48 but care must be taken to prevent heating of the liquid to a temperature at which decomposition will take place. Each zone is provided as before with a nozzle 53, a collecting trough 54, overflow pipes 55, and also external pumping means similar to that shown in Fig. 1. The overflow pipes 55 are associated with all of the troughs 54, as well as the trough 40. Near the bottom of the tower in the lowermost zone 46, the circulated liquid is drawn off from the bottom of the tower through a pipe 56 and delivered to the nozzle by a pump 57. As in the case previously described, all of the pumps are preferably placed at a level below the tower approximating the barometric height of the oil column. The reflux supply 30, its pipe 32, and valve 34 are similarly arranged to those in Fig. 1.

In the apparatus shown in Fig. 2, the operation is similar to that shown in Fig. 1, with the exception that the heavier liquids collected in the various troughs below the inlet 38 are subjected to some vaporizing heat by the jacket 48. Any of the light vapors which it is desired should pass out with the distillate are therefore given an opportunity to rise through several spray zones in which the same process of substitution is carried out. The liquid admitted through the reflux pipe progresses from the top to the bottom of the tower, increasing in average boiling point as it flows downwardly by virtue of its taking up the higher boiling constituents from the vapor. The provision of spray zones below the vapor inlet conduces to a more sharply defined separation between the distillate and the desired heavy cylinder oil. As in the former case, intermediate products may be tapped off from any of the collecting troughs if such are desired.

Having thus described the invention, what is claimed is:—

1. An apparatus for rectification under high vacuum comprising a tower having a substantially unobstructed path for flow of vapors therethrough, an inlet for vapors below the top of the tower, a spray device in the tower for spraying liquid across the path of the vapors, a collecting trough for the liquid, and means for returning the collected liquid from the trough to the spray device including a pump external to the tower, and pipes leading from the trough to the pump and from the pump to the spray device, the pump being located below the tower a distance approximating the length of a barometric column of the liquid.

2. A method of rectifying vapors which consists in passing the vapors through a substantially unobstructed path, maintaining a high vacuum throughout the path of vapor flow, forming blankets of liquid in finely divided form in a plurality of rectifying zones, said blankets being transverse to the passage of vapors, removing the liquid from the path and recirculating it in each zone for repeated contact with the vapors, adding liquid reflux to the zone last traversed by the vapors, and permitting overflow of liquid from zone to zone in general countercurrent to the vapors.

3. A method of rectifying vapors under vacuum which consists in passing the vapors upwardly through a substantially unobstructed path, maintaining a high vacuum through the path of vapor flow, forming blankets of liquid in finely divided form in a plurality of rectifying zones, said blankets being transverse to the passage of vapors, removing the liquid from the path and recirculating it in each zone for repeated contact with the vapors, adding liquid reflux to the zone last traversed by the vapors, and permitting overflow of liquid downwardly from zone to zone in general countercurrent to the vapors.

4. A method of rectifying vapors under vacuum which consists in passing the vapors through a substantially unobstructed path, maintaining a high vacuum throughout the path of vapor flow, spraying liquid in finely divided form in a plurality of zones and transversely of the passage of the vapors, removing the liquid from the path and recirculating it in each zone for repeated contact with the vapors, adding liquid reflux to the zone last traversed by the vapors, and permitting overflow of liquid from zone to zone in general countercurrent to the vapors.

5. A method of rectifying vapors under vacuum which consists in passing the vapors upwardly through a substantially unobstructed path, maintaining a high vacuum throughout the path of vapor flow, spraying atomized liquid horizontally across the path of the ascending vapors in a plurality of zones, collecting the sprayed liquid in each zone, removing the collected liquid from the path of vapor flow and recirculating it in each zone for repeated contact with the vapors, adding liquid reflux to the uppermost zone, and permitting overflow of liquid from zone to zone downwardly.

In testimony whereof I have signed my name to this specification.

RAYMOND R. COLLINS.